W. P. MOTT.
SPRAYING APPARATUS.
APPLICATION FILED DEC. 27, 1911.

1,254,834.

Patented Jan. 29, 1918.
2 SHEETS—SHEET 1.

Witnesses:
John Enders
Henry A. Parks

Inventor:
William P. Mott,
by Sheridan, Wilkinson, Scott & Richmond,
Attys.

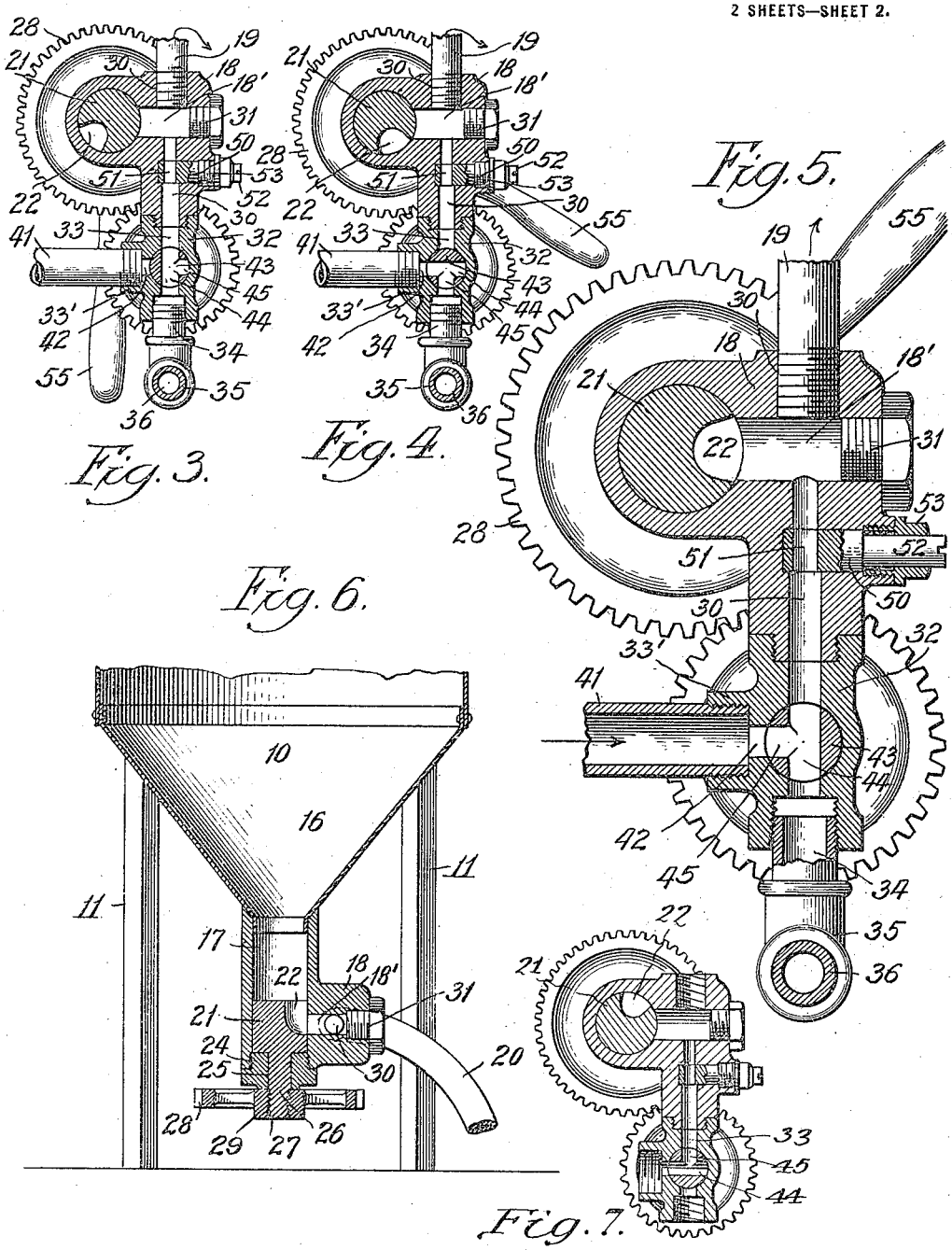

UNITED STATES PATENT OFFICE.

WILLIAM P. MOTT, OF CHICAGO, ILLINOIS.

SPRAYING APPARATUS.

1,254,834.      Specification of Letters Patent.      Patented Jan. 29, 1918.

Application filed December 27, 1911. Serial No. 668,140.

*To all whom it may concern:*

Be it known that I, WILLIAM P. MOTT, a citizen of the United States, residing at Chicago, in the county of Cook and State of Illinois, have invented certain new and useful Improvements in Spraying Apparatus, of which the following is a specification.

This invention relates to improvements in spraying apparatus, and has for its object to provide an improved device for spraying sand, paint or other fluids. An object of this invention is to provide an improved regulating and controlling means for the fluid supply in connection with the spraying apparatus, and it aims to provide an apparatus of construction and operation so simple as to be practically proof against injury from unskilled operators.

Other objects will appear in the specification and claims, taken in connection with the drawings, in which—

Figure 1:
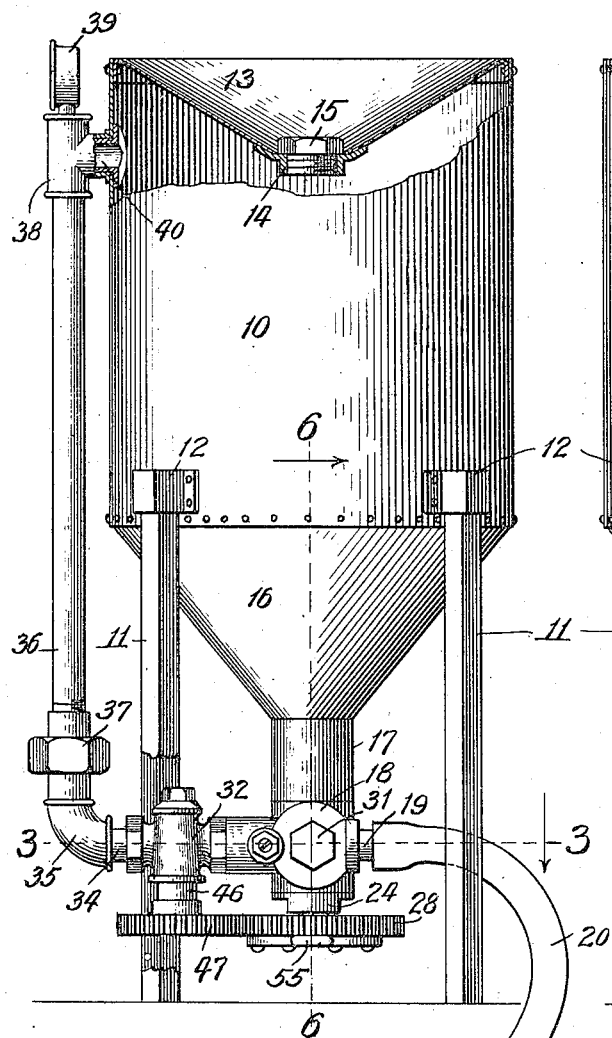
Figure 2:
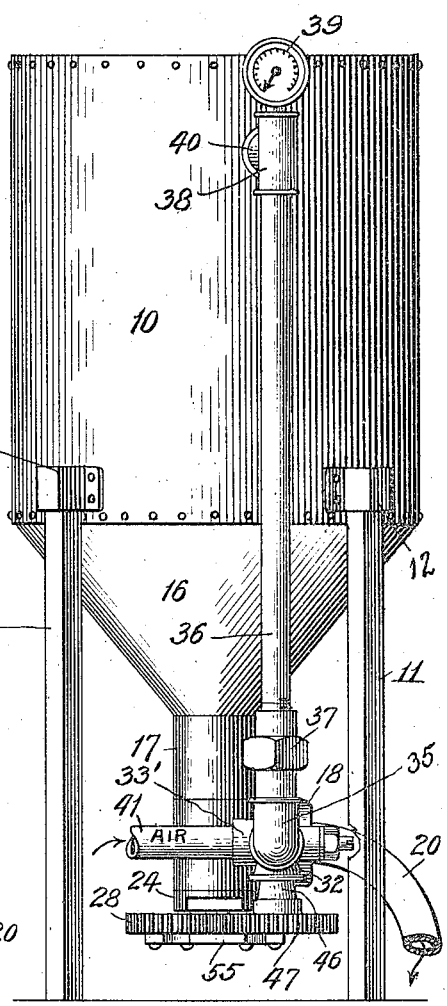

Figure 1 is a side elevation of my device;

Fig. 2 a side elevation of my device in position at right angles to that of Fig. 1;

Fig. 3, a transverse section on the line 3, 3 of Fig. 1, showing valves in one position;

Fig. 4, a section on the same line, showing the valves in the second position;

Fig. 5, an enlarged section along the same line as Figs. 3 and 4, showing the valves in a third position; and Fig. 6, a detail longitudinal section along the line 6, 6 of Fig. 1;

Fig. 7 is a cross section similar to Figs. 3 and 4, showing the valves in what I term their fourth position.

Like numerals refer to like elements throughout the drawings, in which 10 denotes a receptacle for the material to be sprayed, such as sand, or the like. This receptacle is provided with supporting legs 11 secured to the body by sockets 12. The body is provided at its upper portion with a cap 13 shown concave with respect to the receptacle. This cap 13 is provided with a filler opening 14 having the plug 15 threaded thereinto. The lower portion 16 of the receptacle 10 is formed in the shape of a funnel or inverted cone terminating in and secured to the duct 17. Secured to the lower portion of the duct 17 and projecting therefrom is the elbow 18 having the aperture 18' formed therein communicating at its outer extremity with the passage 30 to which is threadedly or otherwise engaged a pipe 19 to which may be secured a tube 20 which in ordinary practice is in communication with a spraying nozzle, or other distributing member, not shown. The other extremity of the aperture 18' is adapted to communicate with the duct 17 and the interior of the receptacle 10. Located at the outer extremity of the aperture 18' is the threaded plug, 31.

A plug valve 21 is rotatably carried in the lower portion of the duct 17 and is provided with a scooped or hollowed out groove 22 adapted to, when in position, furnish communication between the aperture 18' and the interior of the receptacle 10 through the duct 17. Threadedly or otherwise secured in the lower portion of the duct 17 is a plug 24 centrally apertured at 25. The plug valve 21 is formed with a depending stem 26 threaded at its lower extremity 27. This stem 26 is adapted to project downwardly through and closely fit the aperture 25 in the plug 24. A gear wheel 28 having a centrally apertured and threaded hub 29 is secured to the threaded portion 27 of the valve stem 26.

A T union 32 is threadedly secured to the elbow 18 at the extremity opposite the connection of the tube 19 thereto. This T 32 is provided with a passage 33 therethrough in alinement with and forming a continuation of the passage 30. At the opposite end of the T 32 is secured a tube 34 to which is secured an elbow 35. Secured to the upwardly projecting extremity of the elbow 35 is a pipe duct 36 having the union 37 and connected at its upper portion to the T 38. This T carries at its upper extremity a pressure gage 39 and at its central projection 40 is secured to and in communication with the interior of the receptacle 10. Secured to the central projection 33' of the T 33 is a pipe 41 leading from a source of air supply under pressure adapted to communicate through the short passage 42 of the T 32 with the longitudinal passage 33 of the said T. A three-way plug valve 43 is located in the central portion of the T 32 and is provided with the longitudinal aperture 44 and the aperture 45 at right angles thereto, these apertures being in communication and so related as to be adapted to communicate with the ducts 41, 36 and 30, respectively, when in the position shown in Fig. 5. This plug valve 43 is provided with a downwardly projecting stem 46, the lower extremity of which is secured to the gear wheel 47 in mesh with the gear wheel 28. These gears are of predetermined size and pitch for a purpose to be hereinafter described. Projecting into the elbow 18 intermediate the passage 18' and the passage 42 is a restricting plug 50 formed with an aperture 51 adapted to register with the passage 30 when in its fully depressed position. This plug is provided with a screw-threaded portion or stem 52 projecting through a screw threaded gland 53. By rotatable stem 52 the plug 50 may be moved to fully open the passage 30 or restrict the same as desired. Suitable packing surrounds the stem 52 inside the gland, 53, to prevent leakage of air therearound.

Secured to one of the gear wheels, preferably 28, is an operating handle 55. These gear wheels, as stated above, are of a predetermined size and number of teeth, so that the valves 21 and 43 may be operated simultaneously to obtain the desired effect. When the valve 43 is in the position shown in Fig. 3 a continuous passage is provided from the tube 19 to and through the duct 36 to the interior of the receptacle. This position of the valves is that retained when the device is not in operation, or it is desired to fill the receptacle. The valve 21 is at the same time in closed position and also the passage 42 is closed, so that no air is allowed to flow from the pressure tank or other source of supply. When the handle is rotated to the position shown in Fig. 4 of the drawings, the valve 21 is still maintained in closed position and the valve 43 is rotated to position shown, whereby the passage 42 is opened and communication is provided between the said passage 42 and the duct 36 leading to the top of the receptacle 10. In this operation the air under pressure is admitted to the top of the receptacle 10, thus providing pressure upon the top of the contents of the said receptacle to facilitate their flow when valve 21 is opened. The handle 55 is then rotated to the position shown in Fig. 5, when the valve 21 is opened allowing material in the receptacle 10 to flow through the duct 17, the aperture 22 of the valve 21 and through the passage 18' into the main passage 30 at the same time the valve 43 is in the position shown in Fig. 5, there being communication from the air duct 41 to the passages 33 and 30 and also through the pipe duct 36 to the top of the receptacle, so that the pressure is supplied to the top of the contents of the receptacle 10 and at the same time the air under pressure is allowed to flow through the passage 33 and the passage 30, where it may go with the contents of the receptacle 10 flowing out through the valve 21 and passage 18' and the commixed material and air is forced out through the pipe 19 and tube 20.

It will thus be seen that by the three movements of the handle 55 in the first position the air supply is closed and also the material supply; in the second position the pressure is transmitted to the contents of the receptacle 10, but the material supplied is kept cut off by the valve 21, while in the third position the valve 21 is opened and the air from the air supply still transmits pressure to the contents of the receptacle and also furnishes the atomizing fluid. By this cycle of operations it will be seen that pressure is imparted to the contents of the receptacle prior to their discharge, thus insuring a ready flow of material when valve 21 is opened. It is to be noted that after the spraying is concluded the valve 43 may be turned to a fourth position by rotating gear 47 ninety degrees farther, when air will be allowed to flow through the passages 33 and 30 to clean the same, the valve 21 being closed simultaneously with the rotation of the valve 43. The gears and valves being constructed of a predetermined size, it is obvious that an unskilled operator may be trusted with the operation of my device, since all that is required is to rotate the handle 55 in the required direction. This serves to make the device practically "foolproof", and correct operation is automatically insured.

I do not wish to restrict myself to the exact details or arrangement of my device as shown in the drawings and described in the specification beyond the scope of the appended claims.

I claim:

1. In a device of the class described, a receptacle, a duct leading from said receptacle, a duct leading to said receptacle, a passage communicating with an air supply and connecting said ducts, means to control the communication of said passage with said air supply, said means being also adapted to control the communication of said second named duct with said passage, other means to control the communication of said first named duct with said passage, both of said means being adapted to operate in correlation.

2. In a device of the class described, a receptacle, a duct leading from said receptacle, a duct leading to said receptacle, a passage communicating with an air supply and communicating with said ducts, means to control the communication of said first named duct with said passage, means to control the communication of said second named duct with said passage, and also to control the communication of said air supply with said passage, said last named means being adapted in different positions to permit air only to pass through said passage, or to permit the passage of air to said receptacle only, or to permit the passage of air through said passage and to said receptacle simultaneously.

3. In a device of the class described, a receptacle, a duct leading from said receptacle, a duct leading to said receptacle, a passage communicating with said ducts and also with an air supply, means to control the communication of said first named duct with said passage, means to control the communication of said second named duct with said passage, and also to control the communication of said air supply with said passage, said last named means being adapted in different positions to permit air only to pass through said passage, or to close the communication of said air supply to said passage, or to permit the passage of air to said receptacle only, or to permit the passage of air through said passage and to said receptacle simultaneously.

4. In a device of the class described, a receptacle, a duct leading from said receptacle, a duct leading to said receptacle, a passage communicating with an air supply and communicating with said ducts, means to control the communication of said first named duct with said passage, and means to control the communication of said second named duct with said passage, and also to control the communication of said air supply with said passage, said last named means being adapted in different positions to permit air only to pass through said passage, or to permit the passage of air to said receptacle only, or to permit the passage of air through said passage and to said receptacle simultaneously, said first named means being adapted to allow the passage of material from said receptacle when said second named means is in its last named position.

5. In a device of the class described, a receptacle, a duct leading from said receptacle, a duct leading to said receptacle, a passage communicating with an air supply, and communicating with said ducts, means to control the communication of said first named duct with said passage, means to control the communication of said second named duct with said passage and also to control the communication of said air supply with said passage, said last named means being adapted in different positions to permit air only to pass through said passage, or to permit the passage of air to said receptacle only, or to permit the passage of air through said passage and to said receptacle simultaneously, said first named means being adapted to allow the passage of material from said receptacle when said second named means is in its last named position, both of said means being interconnected so that said first named means will allow material from said receptacle to pass through said first named duct to said passage when said second named means is in its last named position.

6. In a device of the class described, a receptacle, a duct leading therefrom, a second duct leading to said receptacle, a passage leading from an air supply and connecting said ducts, said passage being provided with an outlet, a closure for said first named duct, a closure for said second named duct and air passage, said second named closure being constructed so as to permit air only to pass through said passage when in one position, to pass from said air supply to said receptacle when in a second position, and to said receptacle through said second named duct, and also through said passage when in a third position, said first and second named closures being so interconnected that said first named closure will open only when said second named closure is in its third position.

7. In a device of the class described, a receptacle, a duct leading therefrom, another duct leading to said receptacle, a passage communicating with an air supply and connecting said ducts, said passage being provided with an outlet, a closure for said first named duct, a closure for said second named duct and air passage, said second named closure being constructed so as to permit air only to pass through said passage when in one position, to close said air supply and leave said second named duct open when in a second position, to pass air from said air supply to said receptacle only, when in a third position, and to said receptacle through said second named duct, and also through said passage when in a fourth position, said first and second named closures being so interconnected that said first named closure will open only when said second named closure is in its said third position.

8. In a device of the class described, a receptacle, a duct leading from said receptacle, a duct leading to said receptacle, a passage connecting with an air supply and connecting said ducts, means to control the communication of said passage with said air supply, said means being also adapted to control the communication of said second named duct with said passage, and means to control the communication of said first named duct with said passage.

In testimony whereof, I have subscribed my name.

WILLIAM P. MOTT.

Witnesses:
HENRY A. PARKS,
F. A. FLORELL.